UNITED STATES PATENT OFFICE.

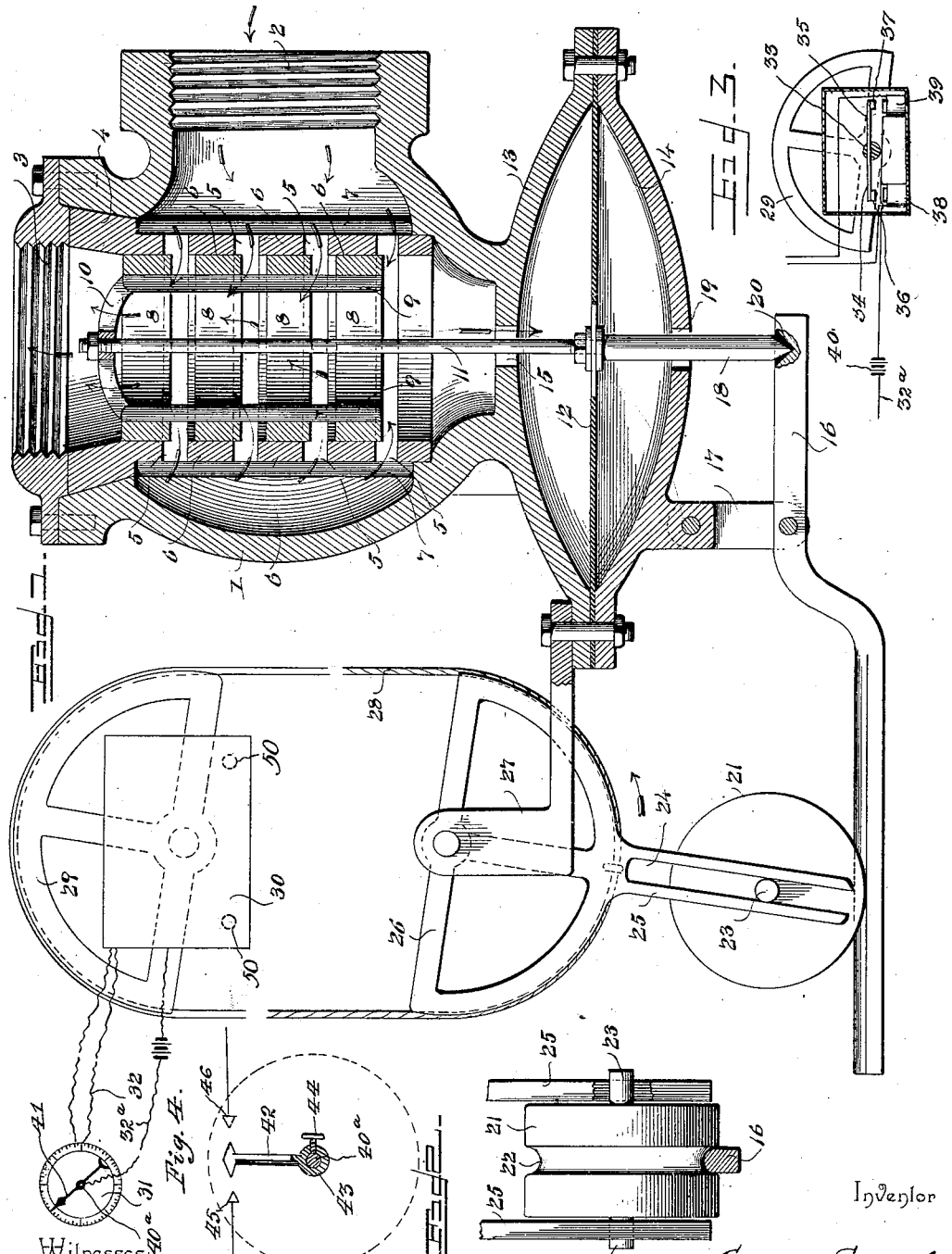

GEORGE SCARFE, OF TOWANDA, PENNSYLVANIA.

THERMOSTAT-VALVE.

SPECIFICATION forming part of Letters Patent No. 633,219, dated September 19, 1899.

Application filed December 16, 1897. Serial No. 662,192. (No model.)

*To all whom it may concern:*

Be it known that I, GEORGE SCARFE, a citizen of the United States, residing at Towanda, in the county of Bradford and State of Pennsylvania, have invented a new and useful Thermostat-Valve, of which the following is a specification.

My invention relates to a thermostat or heat-controlled valve for regulating the flow of a heating fluid, such as steam, in connection with a house-service heating system, the thermostatic apparatus being exposed to the atmospheric temperature of the building or room wherein the heat of the steam or other fluid is utilized or radiated; and the object in view is to provide a supply-controlling valve and operating mechanism whereby when the temperature of a room or building reaches a certain predetermined point the valve will be automatically operated to reduce or cut off the supply, whereas when the temperature in said room or building falls below the predetermined degree the mechanism will be operated to again admit heating fluid until the resulting temperature corresponds with that to which the thermostatic device is adjusted. It will be understood that a regulating device constructed substantially in accordance with my invention could be used with advantage in each building heated by a system which is supplied from a common central station or in connection with different apartments of a building having a steam-heating or analogous system or in connection with drying-rooms and their equivalents wherein an unvarying temperature is either desirable or is required in order to attain the desired results.

Further objects and advantages of this invention will appear in the following description, and the novel features thereof will be particularly pointed out in the appended claims.

In the drawings, Figure 1 is a view, partly in section, of a thermostatically-controlled valve constructed in accordance with my invention. Fig. 2 is a detail view of the variable weight and the means for mounting the same. Fig. 3 is a view of one form of thermostatic controlling device which may be used in connection with the apparatus embodying my invention, the casing being sufficiently broken away to disclose the relations between the parts. Fig. 4 is a sectional view to show the relation between the switch-arm and the spindle of the thermometic indicator.

Similar numerals of reference indicate corresponding parts in all the figures of the drawings.

In a valve-casing 1, provided with an inlet-port 2 (adapted to be connected with a street or other supply main, not shown) and an outlet-port 3, (adapted to be connected with a house-service or delivery pipe, not shown,) is arranged a valve-seat 4, secured to the casing in any suitable manner and provided with a series of annular ports 5, said seat being of cylindrical construction, with the rings 6 thereof connected by exterior longitudinal ribs 7. Fitted to slide in the seat is a cylindrical balanced valve 8, comprising a series of rings connected by longitudinal interior ribs 9 and provided with a cross-bar 10, to which is connected the valve-stem 11. This valve-stem is connected at an intermediate point to a diaphragm 12, arranged in a diaphragm-chamber 13, fixed to the casing 1, and preferably having one member integral with the casing and a removable member 14 detachably secured to the fixed member. The diaphragm is exposed to the pressure of the contents of the valve-casing through the port 15, which forms a means whereby the valve-stem passes from the interior of the valve-casing into the diaphragm-chamber, and it is obvious that when steam is admitted to the valve-casing by the ports of the valve and of the valve-seat being in registration it will exert a pressure upon the diaphragm proportionate to the boiler-pressure; but as the depression of the diaphragm under the influence of the fluid contents of the valve-casing is utilized as a means of closing the valve-ports it is necessary to provide coöperating counterbalancing devices for maintaining the valve in an open position in opposition to the diaphragm-pressure until the heat supplied by the steam or heating fluid has reached a predetermined degree, said heat (as referred to herein) being that which is communicated to the atmosphere of the room or building through suitable radiating devices, (not shown,) but adapted to be of the ordinary or any preferred construction. To accomplish this variable or yielding opposition to the diaphragm-pressure, I employ a lever 16, which in the drawings is of the first order and is suspended by means of a suitable hanger consisting of a pivotal link 17, the lower extremity or extension 18 of the valve-stem being projected through a vent 19 in the lower side of the diaphragm-chamber and being stepped in a socket 20 in the short arm of the lever. The long arm of the lever supports a variable or shifting weight 21, which is of the rolling type, and is preferably grooved peripherally, as shown at 22, to ride the upper surface or edge of the lever. The trunnions 23 of the weight operate in slots 24 of spaced arms 25, depending from a rocking lever 26, mounted upon a bracket 27, which in the construction illustrated projects from the casing or diaphragm-chamber. In the construction illustrated this rocking lever 26 is of peripherally segmental or semicircular shape and is traversed by a flexible connection, such as a cable 28, connected with a corresponding rocking lever 29, which is in operative relation with a thermostat, (indicated diagrammatically at 30 in Fig. 1.) Any suitable construction of thermostat may be employed, the same preferably being provided with an indicator dial and pointer 31, having coöperating means which are sensitive to heat, the connection between the indicator and the thermostat proper being electrical or otherwise, as indicated by the conductors 32, which extend to electromagnets 38 and 39, and a conductor 32$^a$, which extends to a battery 40, as hereinafter fully explained. It will be understood that the thermometrical member 31 of the apparatus should be arranged in the apartment or chamber in which the atmospheric temperature is to be controlled, while the motor 30 may be arranged near the point of inlet of the heating fluid or contiguous to the valve, as indicated in the drawings.

In Fig. 3 I have shown a construction of thermostat-actuating device which may be used in connection with the apparatus embodying my invention, the same including an actuating rocker-spindle 33, to which is attached the rocker 29, arms 34 and 35, carried by said spindle and having terminal armatures 36 and 37, arranged, respectively, in operative relation with electromagnets 38 and 39, which are in circuit with a battery 40. Also in Fig. 4 I have shown a spindle 40$^a$, which is the same which carries the ordinary thermometer-pointer 41 of Fig. 1 and is in circuit with the battery by means of a conductor 32$^a$, and adjustably attached to this spindle is a switch-arm 42, provided with a collar 43, secured at the desired angular adjustment upon the spindle by means of a set-screw 44, said switch-arm being arranged between spaced contact-points 45 and 46, which are respectively in circuit with the above-mentioned electromagnets. After the desired adjustment of the switch-arm with relation to the pointer or indicator of the thermometer has been attained, whereby the thermometer indicates approximately the desired temperature, the switch-arm will be located between and out of contact with both of the contact-points, whereupon the operation of the device will be as follows: If the temperature in the apartment in which the thermostat is located rises sufficiently to bring the switch-arm into contact with the point 46, an electrical circuit is completed through the electromagnet 39, whereupon the armature is attracted to swing the rocker 29 toward the right, and thus move the weight 21 outward upon the lever 16, whereas when a current is established through the other electromagnet the armature 36 is attracted to swing the rocker in the opposite direction, and thus move the weight 21 inward upon the lever 16. In this way by variations of temperature sufficient to bring the switch-arm into contact with the opposite terminals 45 and 46 the weight 21 will be moved to either close or allow the opening of the valve, as hereinbefore explained. When the shifting weight is located at a certain point on the connecting-lever, its downward tendency is sufficient to counterbalance the diaphragm-pressure; but when said weight moves toward the fulcrum of the connecting-lever its counterbalancing effect is diminished, and if the rise in temperature, as indicated by the thermometric member of the apparatus, continues said weight will shift toward the fulcrum of the connecting-lever until its counterbalancing effect is less than the diaphragm-pressure, whereupon the diaphragm will be depressed and the valve will be closed more or less to reduce the quantity of heating fluid which is communicated to the said apartment or building. Conversely, when the temperature in the apartment or building falls below the predetermined degree the apparatus will be actuated in an opposite direction to move the variable or shifting weight outwardly or from the fulcrum of the lever 16, thus increasing the downward or counterbalancing tendency of said weight and causing it to oppose the diaphragm-pressure and return the diaphragm to open the valve-ports. Thus an even temperature in an apartment provided with an apparatus constructed as described may be maintained irrespective of the pressure of heating fluid in the supply-main. Hence when a main is employed to supply heating fluid to a plurality of apartments of different sizes or, as in a town, to a plurality of buildings requiring different degrees of temperature or requiring different quantities of heating agent to attain the desired temperatures an unvarying pressure may be maintained in the main without discomfort to the occupants of the different apartments or buildings, each being regulated by an independent device constructed substantially as specified and shown.

Any suitable means may be employed for limiting the movement of the rocker, such as the stop 50. (Indicated in dotted lines in Fig. 1.)

It will be understood, furthermore, that various changes in the form, proportion, and the minor details of construction may be resorted to without departing from the spirit or sacrificing any of the advantages of this invention.

Having described my invention, what I claim is—

1. The combination with a valve for controlling the flow of a heating agent, of a diaphragm exposed to supply-pressure and connected with the valve for communicating motion thereto in one direction, a counterbalancing device for opposing supply-pressure, the same comprising a lever connected with the diaphragm and a shifting weight traversing the lever for varying the opposition offered to diaphragm-pressure, a thermostat, and mechanism actuated by the thermostat for advancing the weight on the lever toward and from its fulcrum, substantially as specified.

2. The combination with a valve for controlling the flow of a heating agent, of a diaphragm exposed to supply-pressure and connected with the valve for communicating motion thereto in one direction, a counterbalancing-lever connected with the valve for communicating motion thereto in the opposite direction to said supply-pressure, a shifting weight traversing said lever to vary the resistance offered to diaphragm-pressure, and a thermostatically-actuated rocker connected with said weight to advance the same in either direction upon the lever, substantially as specified.

3. The combination with a valve for controlling the flow of a heating agent, of a diaphragm exposed to supply-pressure and connected with the valve for communicating closing motion thereto, a counterbalancing-lever connected to the valve for communicating opening motion thereto, a shifting weight traversing said lever to vary the resistance offered to diaphragm-pressure, and a thermostatically-actuated rocker connected with said weight to advance the same in either direction upon the lever, substantially as specified.

4. The combination with a valve for controlling the flow of a heating agent, of a diaphragm arranged in a diaphragm-chamber in communication with the valve-casing, the valve-stem being connected with said diaphragm and terminating exteriorly of the diaphragm-chamber, a counterbalancing-lever connected with the valve-stem for opposing diaphragm-pressure and moving the valve in a direction opposite to that produced by diaphragm-pressure, a thermostatically-actuated rocker, and a shifting weight, traversing said lever to vary the resistance offered to the diaphragm-pressure and actuated by said rocker, substantially as specified.

5. The combination with a valve for controlling the flow of a heating agent, of a diaphragm exposed to supply-pressure and connected with the valve for communicating motion thereto in one direction, a counterbalancing-lever connected to the valve for communicating motion thereto in the opposite direction, a shifting weight mounted to traverse said lever, and a thermostatically-actuated rocker having slotted arms engaging the trunnions of said shifting weight for moving the latter toward and from the fulcrum of the lever, substantially as specified.

In testimony that I claim the foregoing as my own I have hereto affixed my signature in the presence of two witnesses.

GEORGE SCARFE.

Witnesses:
JOHN H. SIGGERS,
C. E. DOYLE.